H. A. SMITH.
RAKE TOOTH POINT.
APPLICATION FILED DEC. 30, 1908.

962,060.

Patented June 21, 1910.

UNITED STATES PATENT OFFICE.

HENRY ADALBERT SMITH, OF ELGIN, ILLINOIS, ASSIGNOR TO STAR MANUFACTURING COMPANY, OF CARPENTERSVILLE, ILLINOIS.

RAKE-TOOTH POINT.

962,060. Specification of Letters Patent. Patented June 21, 1910.

Application filed December 30, 1908. Serial No. 470,053.

*To all whom it may concern:*

Be it known that I, HENRY ADALBERT SMITH, a citizen of the United States of America, and resident of Elgin, Kane county, Illinois, have invented a certain new and useful Improvement in Rake-Teeth Points, of which the following is a specification.

My invention relates to improvements in rake teeth points, and more especially those used in connection with hay loaders and stackers, and has for its object the production of a device in which the minimum of metal is so disposed as to insure the maximum wear.

A further object is the production of a device in which supplemental wearing means are utilized at the point subjected to the greatest wear.

A further object is the production of a device that can be cheaply and quickly formed from pressed steel and of cold metal, one that will fit snugly over the end of the rake teeth.

These and such other objects as may hereinafter appear are attained by my device, embodiments of which are shown in the accompanying drawings, in which—

Figure 1 represents a side elevation of my device in position. Fig. 2 represents a bottom plan view of Fig. 1. Fig. 3 represents a cross section on the line 3—3 of Fig. 1, looking in the direction indicated by the arrows. Fig. 4 represents a plan view of an approximate form of blank, from which the rake tooth may be formed. Fig. 5 represents a side elevation of a modified form of wearing shoe.

Referring now to the drawings, 6 represents the rake tooth point fitted in position on the end 7 of a rake tooth 8, and held in place by means of a wearing shoe or staple having its ends 10 bent at right angles and extending into the rake tooth 8. A staple in form of a wearing shoe as shown in Fig. 2 at 13, may be used. This staple is provided with inwardly extending points 14, which serve to hold the shoe firmly in place. The angle at which the staples are bent serves to prevent the staples from coming out in the event of the shrinking of the wood. The top of the rake tooth point may be secured to the tooth by means of a screw or staple 11, as shown in Fig. 1, or any other well known fastening means being employed, it being essential however, that the top of such fastening means be practically flush with the top of the tooth, thus offering no obstruction to the passage of hay over the tooth.

Referring now to Fig. 4, it will be noted that the blank 15 is provided with three wings 16—17—18, the retaining wings 16—17 being pointed forming the bottom and top respectively of the finished article, the blunt wing 18 being folded under, as shown in dotted lines in Fig. 3, forming a reinforcement for the bottom 19.

As shown in Figs. 3 and 4, the blank is provided with a groove or depression 20 within which the edge 21 of the blank fits when pressed in place, thus insuring a practically continuous surface for the finished article. The upper side of the wearing shoe 9 is preferably flattened, fitting snugly against the bottom of the point and preferably presenting a smooth rounding surface on the under side where it comes in contact with the ground. Of course, I do not limit myself to a wearing shoe of any particular cross section or shape, the broad idea being that of providing an additional wearing member that will take up a great proportion of the wear on the point, and that can be replaced at a slight cost when worn out, thus insuring for the rake tooth point as long a life as that of the implement to which it is attached.

The groove 20 can be dispensed with, and the side 21 thinned down, or the side may be left the regular thickness without detracting from the wearing quality of the point.

It will thus be seen that by the use of my blank device is formed in which the end of the point and the curved under surface is reinforced at those points that are subjected to the greatest wear while the double thickness of the metal carried toward the inner end of the point braces or strengthens the point on its projecting work against obstacles, while the inside of the device is of such a shape as readily receives the end 7 of the rake tooth or bar with a minimum of cutting or fitting. The use of pressed steel insures great strength with a minimum of weight, and as many points are used on a machine, the matter of weight is an important element, both in the operation as well as in the cost. The use of the pressed steel insures a smooth surface, as stated, as the natural surface of pressed steel is semi-polished or smooth as distinguished from the rough surface of cast metal The staple form shown in Fig. 5 may be used in most cases, or screws that can be readily driven in place or removed, the converging points 14 of staples 5 preventing the staple from working loose, from shrunken material.

I claim:—

1. A rake tooth point formed from an integral pressed-steel blank and provided with a semi-polished or smooth wearing surface formed from a portion of said blank folded over on itself.

2. A rake tooth point formed from an integral grooved pressed-steel blank and provided with a semi-polished wearing surface upon the outer portion of said blank when folded over on itself.

3. A rake tooth point formed from an integral blank of pressed steel and provided with a wearing wing forming a double fold at the bottom in suitable position to resist collapsible pressure against said point.

4. A rake tooth point formed from an integral grooved pressed-steel blank and provided with a wearing wing folded over and fitting closely within said groove against the bottom of said point, the edge of said wing being protected by said groove or channel.

5. A rake tooth point formed from an integral blank of cold metal provided with a wearing wing folded over and fitting closely against the bottom of said point, providing a double fold of metal at the point subjected to the greatest wear, and a wearing shoe fitting upon the under side of said point.

6. A rake tooth point formed from an integral grooved pressed-steel blank folded on itself pressed into shape, and having an inwardly curving socket adapted to receive the end of a rake tooth with a minimum of shaping.

7. A rake tooth point formed from an integral steel blank pressed into shape and provided with a reinforced wearing surface and a wearing shoe fitting upon the under side of said point and provided with means for holding said point in position on a rake tooth.

8. A rake tooth point formed from an integral grooved blank, provided with a reinforced wearing surface, and a wearing shoe fitting upon the under side of said point and provided with means for holding said point in position on a rake tooth.

9. A rake tooth point formed from an integral pressed-steel blank provided with a semi-polished outer surface, a double fold of metal at its bottom, and means for protecting the edge of the outer fold and presenting a smooth surface to the ground when said point is in use.

Signed by me at Elgin, Kane Co., Illinois, this 18th day of Dec. 1908.

HENRY ADALBERT SMITH.

Witnesses:
   J. W. GAMBLE,
   CLARENCE E. SAWYER.